United States Patent [19]
Mills et al.

[11] Patent Number: 5,321,874
[45] Date of Patent: Jun. 21, 1994

[54] MULTI-POSITIONER MACHINING SYSTEM

[75] Inventors: Daniel M. Mills, Riverview; Richard Ogletree, Southfield, both of Mich.; Thomas J. Lindem, Rockford, Ill.

[73] Assignee: Ford Motor Company, Dearborn, Mich.

[21] Appl. No.: 923,717

[22] Filed: Jul. 31, 1992

[51] Int. Cl.$^5$ .............. B23Q 37/00; B65G 47/00; B23C 1/10; B23B 39/04
[52] U.S. Cl. .................. 29/33 P; 29/563; 198/346.1; 408/129; 409/164
[58] Field of Search .............. 29/33 P, 563, 26 A, 29/564; 483/14, 15; 198/346.1, 345.3; 364/474.25; 409/163, 164, 231; 408/129

[56] References Cited

U.S. PATENT DOCUMENTS

| | | | |
|---|---|---|---|
| 4,003,456 | 8/1986 | Hiroyasu et al. | 29/33 P |
| 4,102,035 | 7/1978 | Voglrieder et al. | 483/56 |
| 4,359,814 | 11/1982 | Pihery et al. | 29/27 C |
| 4,485,911 | 12/1984 | Cameron | 198/345.3 |
| 4,598,816 | 7/1986 | Kutzli et al. | 198/465.1 |
| 4,621,408 | 11/1986 | Gabrielli | 483/15 |
| 4,664,570 | 5/1987 | Tsukiji et al. | 364/474.25 |
| 4,697,318 | 10/1987 | Wickham et al. | 29/563 X |
| 4,711,016 | 12/1987 | Genschow et al. | 483/15 |
| 4,747,193 | 5/1988 | Hashidate et al. | 29/563 X |
| 4,761,876 | 8/1988 | Kosmowski | 483/54 X |
| 4,797,991 | 1/1989 | Yamaguchi et al. | 198/346.1 |
| 5,108,236 | 4/1992 | Arai et al. | 409/163 |

FOREIGN PATENT DOCUMENTS

| | | | |
|---|---|---|---|
| 3236356 | 4/1984 | Fed. Rep. of Germany | 29/33 P |
| 127959 | 7/1985 | Japan | 483/15 |
| 185335 | 7/1990 | Japan | 29/33 P |

*Primary Examiner*—William Briggs
*Attorney, Agent, or Firm*—Joseph W. Malleck; Roger L. May

[57] ABSTRACT

A machining system that has (i) plural machining cells spaced along a path, each having a single-point-tool and a rapid-positioning assembly for positioning the tool for multiple insertions into a workpiece as well as rapid tool exchange at speed rates that approach or exceed one G; (ii) table means for presenting a table surface in a selected plane for each cell; (iii) workpiece means for each table surface having keying surfaces for lockingly mating with a reference point of such table surface; (iv) transfer means for rapidly replacing a machined workpiece with an unmachined workpiece on a table surface, the just-machined workpiece being transferred to the next table surface while the substituted workpiece is undergoing machining; and (v) programmed electrical control means for activating the positioning assemblies and transfer means.

12 Claims, 11 Drawing Sheets

PREVIOUS ART

MULTI-POSITIONER MACHINING SYSTEM

BACKGROUND OF THE INVENTION

1. Technical Field

The invention relates to machining systems utilizing electrical linear motors and, more particularly, to machining systems that use multiple tools, each independently positionable at high acceleration/deceleration rates.

2. Discussion of the Prior Art

Multi-axis positioners for light or heavy industrial machining use mechanical ball-screw drives (see, for example, U.S. Pat. Nos. 4,102,035 and 4,359,814). Such drives inherently suffer from slow wind-up which inhibits rapid positioning and thereby productivity. To increase productivity, a great number of machining cells need to be used, each at its own limited production rate. It is conventional in the U.S. automotive industry to shape a complex workpiece, such as an engine block or head, by transferring such workpiece, clamped on a fixture and pallet, along a series of machining stations where a specific surface is cut or finished by a dedicated tool (or cluster of dedicated tools) fed along a unitary axis. The workpiece must be transferred, with time-consuming effort, to other fixtures and/or pallets to expose a variety of faces to the feed axis of the tools. The percentage of in-cut time exercised by such a system is low due to the frequency of low speed workpiece transfer and due to the slow rates of tool positioning. Each tool carries out a task dedicated solely to one machining function with little modification over several years of use. The initial cost of fabricating and installing such nonflexible dedicated equipment with complex controls is very high not only due to their sophistication but also due to the large number of single purpose cells needed to complete the shaping of a specific engine block or head.

To spread out the initial high cost of equipment acquisition, minimum volume production requirements are imposed for such lines and such requirements are extremely high, i.e., 400,000-800,000 workpieces per year. Even if the capacity of a machining line, such as for a cylinder block, were reduced to 300,000 units per year (or 1000 units per day using two shifts) and dedicated multiple-spindle turret heads were incorporated in at least some of such machining cells (as is practiced by some Japanese automotive companies to introduce semiflexibility, see FIG. 1), the number of machining cells would still need to be at least about 40. This high number of machining cells is costly in initial aquisition, maintenance, and risk of down-time resulting from failure of a single cell. Such prior art manufacturing systems do not allow the automotive producer to respond quickly to market demand changes either for different engine block or head designs or for different volume levels of the existing block or head design.

It is an object of this invention to provide a new approach to machining systems that dramatically reduces the number of machining cells required in machining a given workpiece, permits continuous use of the machining line to flexibly produce different products in volumes such as 50,000-500,000 per year, improves repeatability and accuracy of machining, increases the number of machining tasks and rate of carrying out such tasks at each station, and reduces the handling time for workpieces between in-cut stages.

SUMMARY OF THE INVENTION

The invention, in one aspect, is a combination of (i) plural machining cells spaced along a path, each having a single-point-tool and a rapid-positioning assembly for positioning the tool for multiple insertions into a workpiece as well as rapid tool exchange at speed rates that approach or exceed one G; (ii) table means for presenting a table surface in a selected plane for each cell; (iii) workpiece means for each table surface having keying surfaces for lockingly mating with a reference point of such table surface; (iv) transfer means for rapidly replacing a machined workpiece with an unmachined workpiece on a table surface, the just-machined workpiece being transferred to the next table surface while the substituted workpiece is undergoing machining; and (v) electrical control means for activating the positioning assemblies and transfer means. The positioning assembly is preferably comprised of relatively movable stacked elements that provide for full three-dimensional movement of the spindle into and out of a predetermined sized machining space, each positioning means having a plurality of linear motors to selectively move the spindle at peak accelerations/decelerations of at least about one G and at linear speeds of up to 3000 inches per minute.

Another aspect of this invention is a method of machining a plurality of varied surfaces on a workpiece, the method comprising: (a) locking such workpiece on a fixture having dimensional keys and releasably securing such fixture on an adjustable worktable in a predetermined first position facilitated by said keys; (b) adjacent each worktable, rapidly positioning a rotary single-point-tool for linear feed into a first of said workpiece surfaces while in said first position, said positioning being carried out at accelerations/decelerations of at least about one G; (c) feeding the rotating tool into the workpiece to carry out machining at speeds of 1-1300 inches per minute for drilling and boring, and at least about 5000 sfm for milling; (d) after withdrawing the tool from the workpiece, repositioning the single-point-tool for another linear feed into other workpiece surfaces, said repositioning being carried out at accelerations/decelerations of at least about one G; and (e) after withdrawing the tool from the workpiece, transferring the workpiece to another of a plurality of worktables while a substituted workpiece is undergoing machining at said worktable in said fixtured first position.

DETAILED DESCRIPTION AND BEST MODE

This invention has discovered that machining system time can be reduced to about one-tenth of comparable prior art systems if its machining cells have their rotary cutting tool limited to a single-point type, position the tool at extremely high accelerations/decelerations (approaching or exceeding one G), and are separately arranged along a path so that as one workpiece is undergoing machining at a cell, the just-machined workpiece is being transferred to the next cell ready for replacement of the workpiece undergoing machining.

Figure 2:
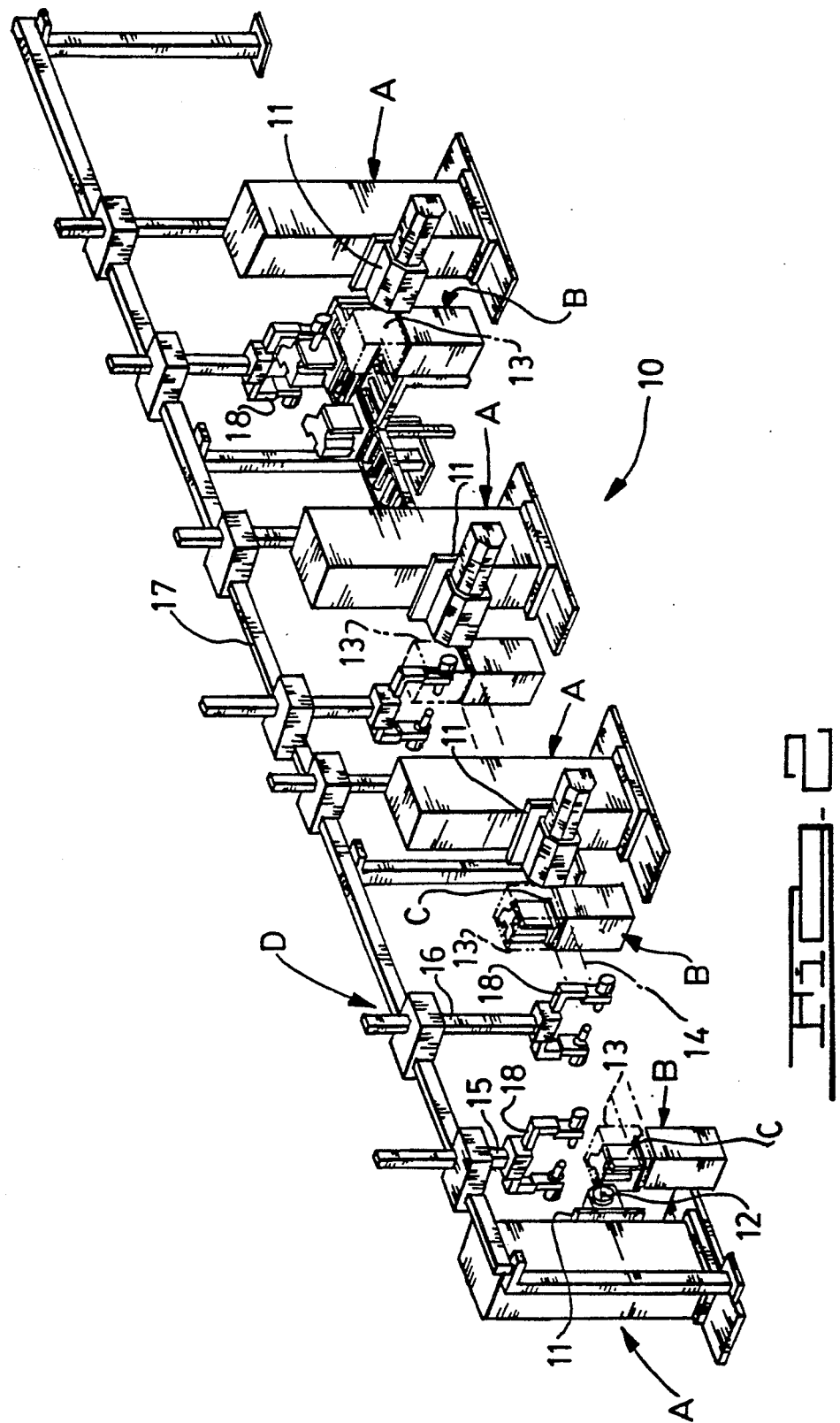
FIG. 2 is a schematic perspective view of one machining system utilizing a plurality of rapid positioning machining modules and embodying the principles of this invention.

As shown in FIG. 2, such a machining system 10 for machining automotive engine components, e.g., cast aluminum blocks, comprises a plurality of machining cells A, each having a rapid-positioning assembly 11, actuated by linear motors, to position and feed a single-point rotary cutting tool 12 into a machining space 13. The system also comprises a worktable means B for orienting the workpiece means C within the machining space 13, and a transfer means D for syncopatedly moving the workpieces along a path 14 on which the worktables are aligned. The transfer means has tandem gantry arms, such as 15, 16, which controllably move along a rail 17 following path 14; automated grippers 18, at the bottom end of the arms, grasp the workpiece for raising and lowering.

Figure 3:
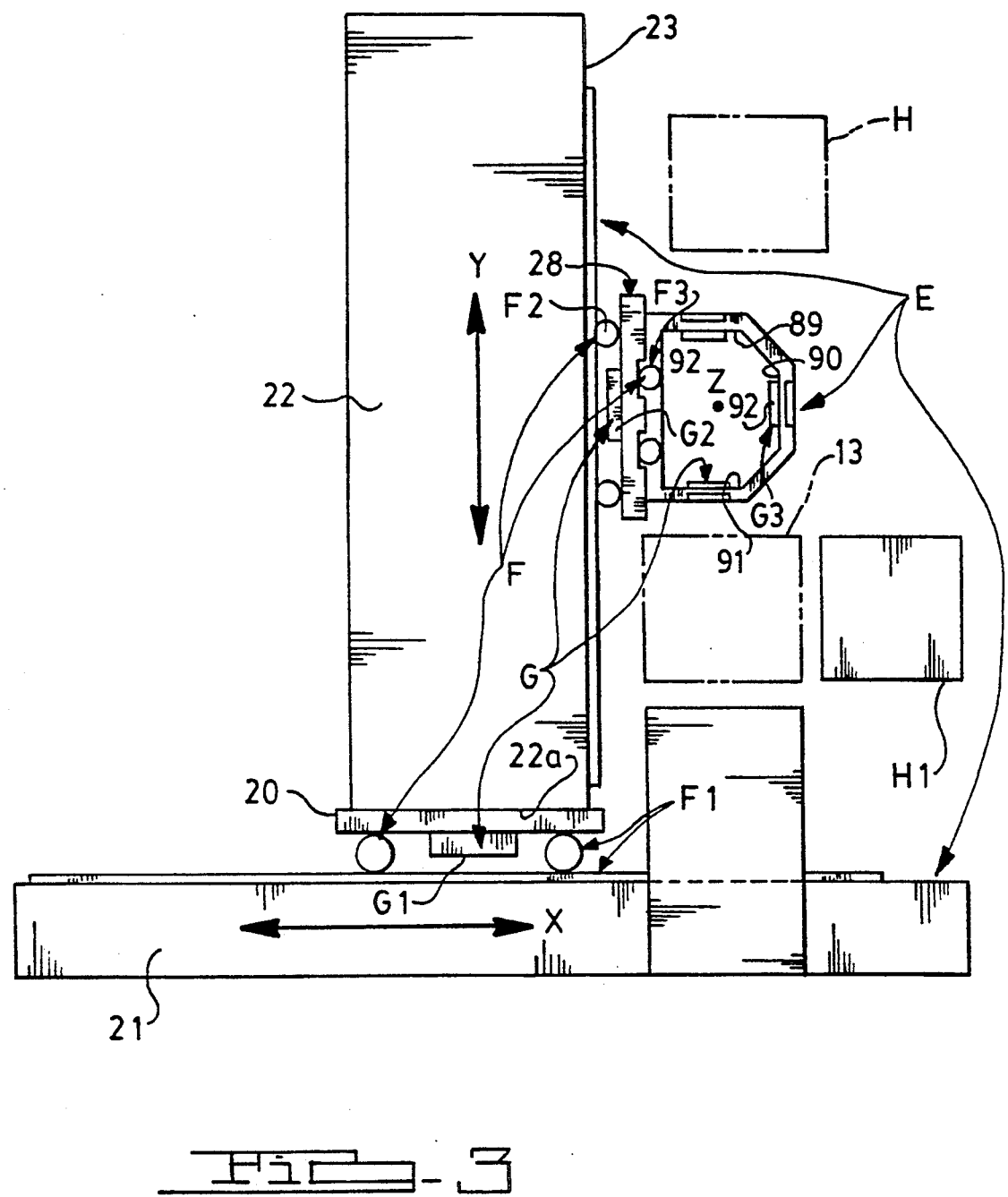
FIG. 3 is a schematic elevational view of one machining module of this invention.

As shown in FIG. 3, the positioning assembly is a three-axis module having a support assembly E, bearing and rail assembly F, linear motor assembly G, workpiece support machining space 13, and a tool inventory H or H-1. Note that the major movable elements of the support assembly are stacked on a platform 20. Support assembly E has a first portion for defining an X-axis comprising a vibration-damping, heavy, reinforced, sand-filled rectangular bed 21 that supports the lightweight metal table or platform 20 by way of a bearing and rail assembly F-1 as well as a linear motor assembly G-1, both between such table and bed for movement in a plane along the X-axis. Secondly, an upright, essentially hollow column 22 is supported at its bottom end 22a on table 20. The column has at least one side 23 (also sides 24 and 25) aligned with a Y-axis that is perpendicular to the X-axis. Thus, the Y-axis support structure (22) is connected to the movable X-axis structure (20) at only one end.

Figure 4:
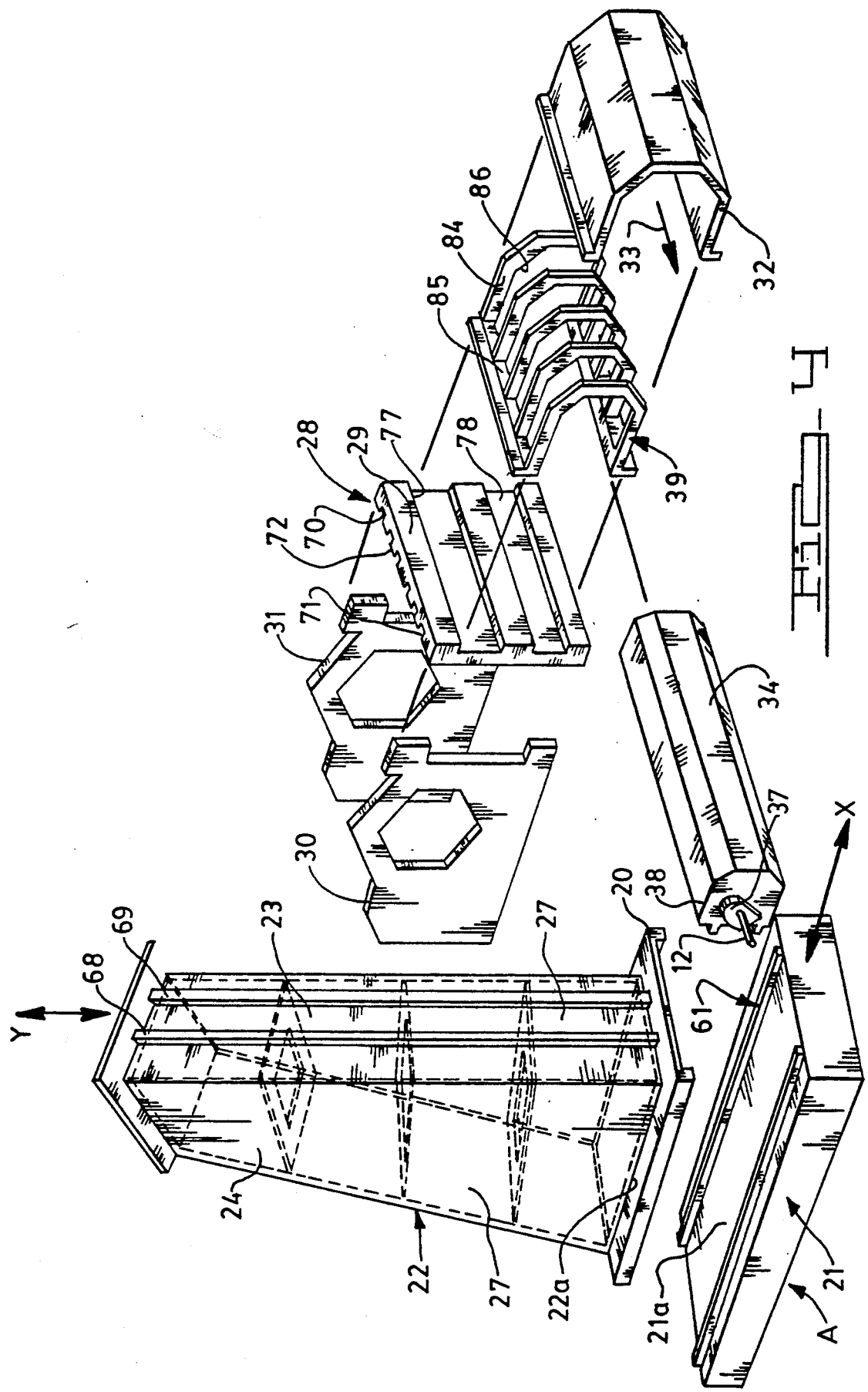
FIG. 4 is an exploded perspective view of the machining module of FIG. 3.
Figure 5:
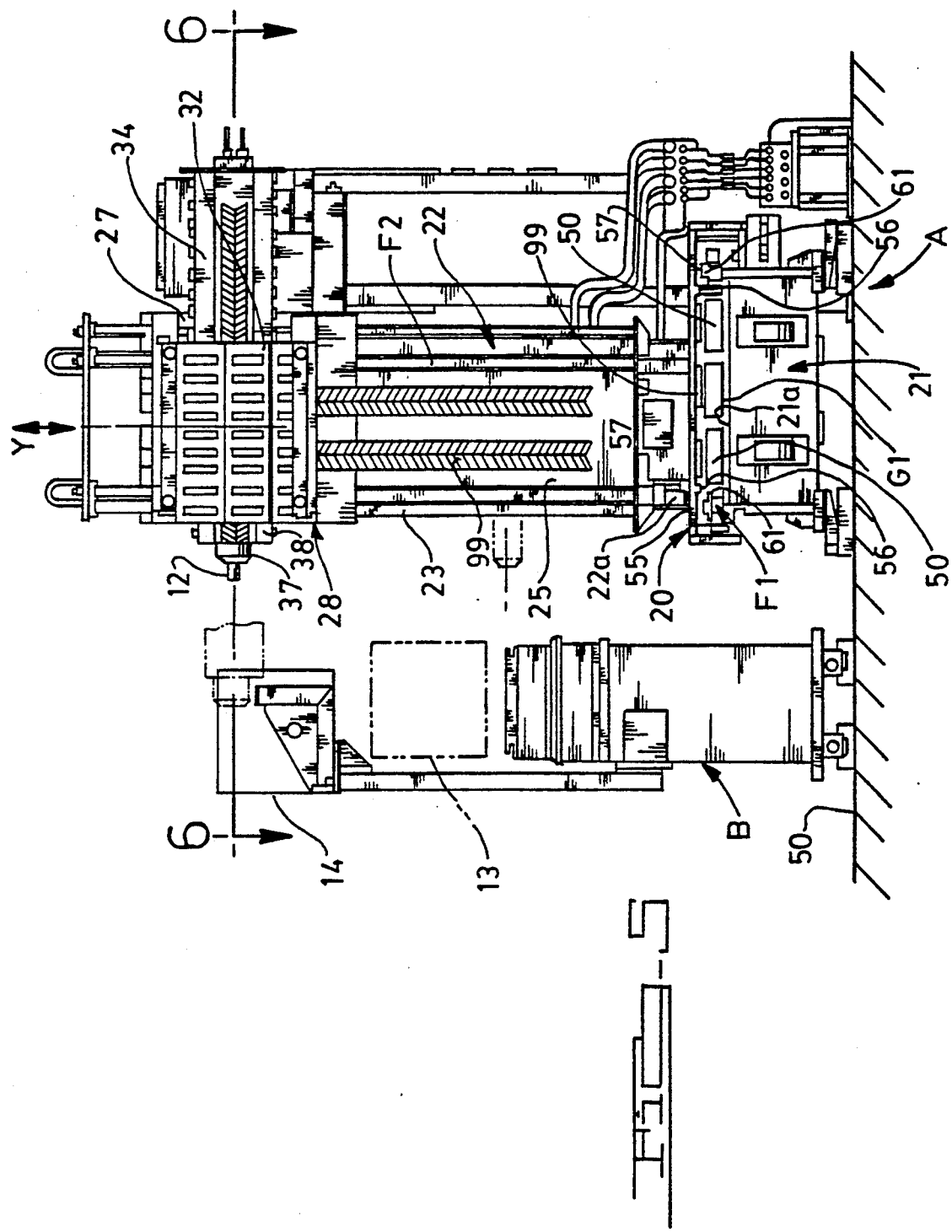
FIG. 5 is an elevational view of the machining module of FIG. 3.

As shown in FIG. 4, column 22 is constituted of a lightweight metal skeleton 26 about which is stretched an integral lightweight metal skin 27. A lightweight metal slide 28 is formed principally as a cast planar plate 29 with optional attached (or integral) lightweight metal wings 30, 31. The slide rides up and down the Y-axis sides (23, 24, 25) of the column by way of the rail and bearing assembly F-2 and is actuated by linear motor assembly G-2. A lightweight metal cage 39, preferably carrying an ultra-lightweight composite skin 32, is fixedly carried on the slide 28 to define a Z-axis way 33 that is mutually perpendicular to the Y and X axes. Alternatively, cage 39 may be angularly adjustable to align the Z-axis at an angle with respect to one of the Y or X axes. A lightweight, hollow metal ram 34 is movable within way 33 and supported therein by way of a rail and bearing assembly F-3 and linear motor assembly G-3. The ram 34 fixedly carries spindle 37 at one end thereof with the rotary-driven, signal-point cutting tool 12 exposed for conducting machining tasks such as milling, drilling, and boring.

Table 20 is a generally flat plate having elongate shoulders or ribs 56 on its underside for retaining bearing units as part of assembly F-1 and coil packs 58 as part the assembly G-1. Spaced, ultra-stiff rails 61 are secured to the bed and aligned with the X-axis. Rows of permanent magnets 99 (part of assembly G-1) are carried on the downwardly facing wall of the table and are bonded to steel plates or channels, which encourage a flux path through the adjacent magnets.

Figure 6:
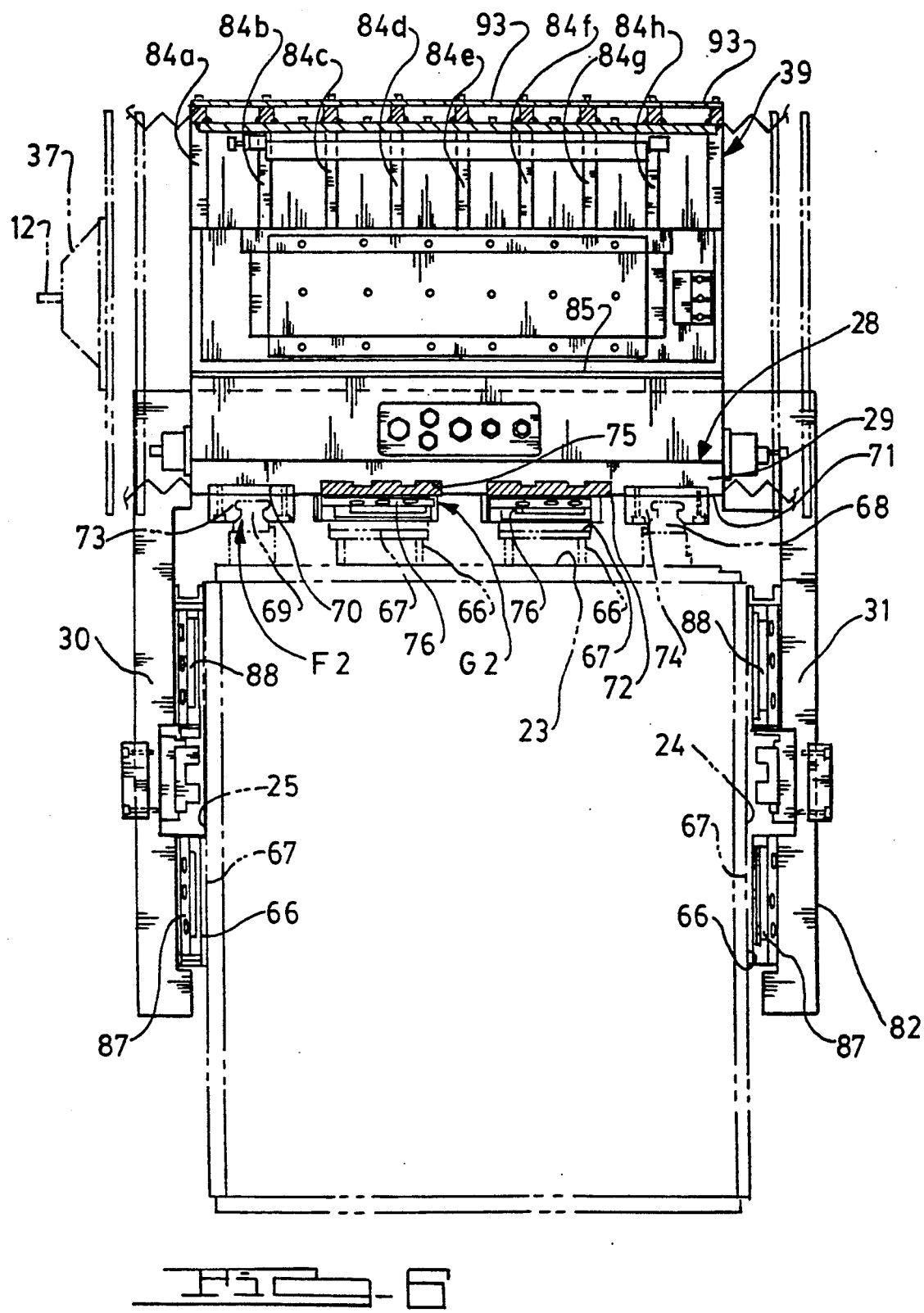
FIG. 6 is an enlarged sectional view of the apparatus of FIG. 5 taken substantially along line 6—6 thereof.

As shown in FIG. 6, slide 28 consists of a plate 29 cast of a lightweight, nonmagnetic metal (i.e., aluminum) with upright receptacles 70, 71 on the backside 72 thereof for fixedly securing recirculating bearing units 73, 74 which operate with rails 68, 69. A plurality of upright dovetail slots 75 are defined to lock-in-place coil packs 76 of linear motors on the backside thereof. Horizontally extending ways 77, 78 on the front side of plate 29 receive recirculating bearing units 79, 80; the wings 30, 31 are each cast as solid, thick, cropped plates. Spaces pairs of linear motor coil packs 87, 88 are mounted side-by-side on the interior of each of the wings, and spaced, side-by-side coil packs 76 are mounted on the plate to effect movement along the Y-axis in cooperation with six rows of permanent magnets 67. The ribbed cage 39 is comprised of a plurality of parallel, separated, cropped bulkheads 84 integral with a web 85 at one side. Each bulkhead has a central opening 86, all the openings being coaxially aligned. The web 85 has secured thereto vertically spaced, horizontally extending rails; recirculating bearing units are mounted on the slide 28. The ribbed cage 39, when combined with a graphite composite shell 93 reinforced with metal stays at longitudinally spaced locations, creates a semihexagonal-shaped tunnel. At three interior sides 89, 90, and 91, coil packs 92 are mounted on the cage 31.

Figure 7:
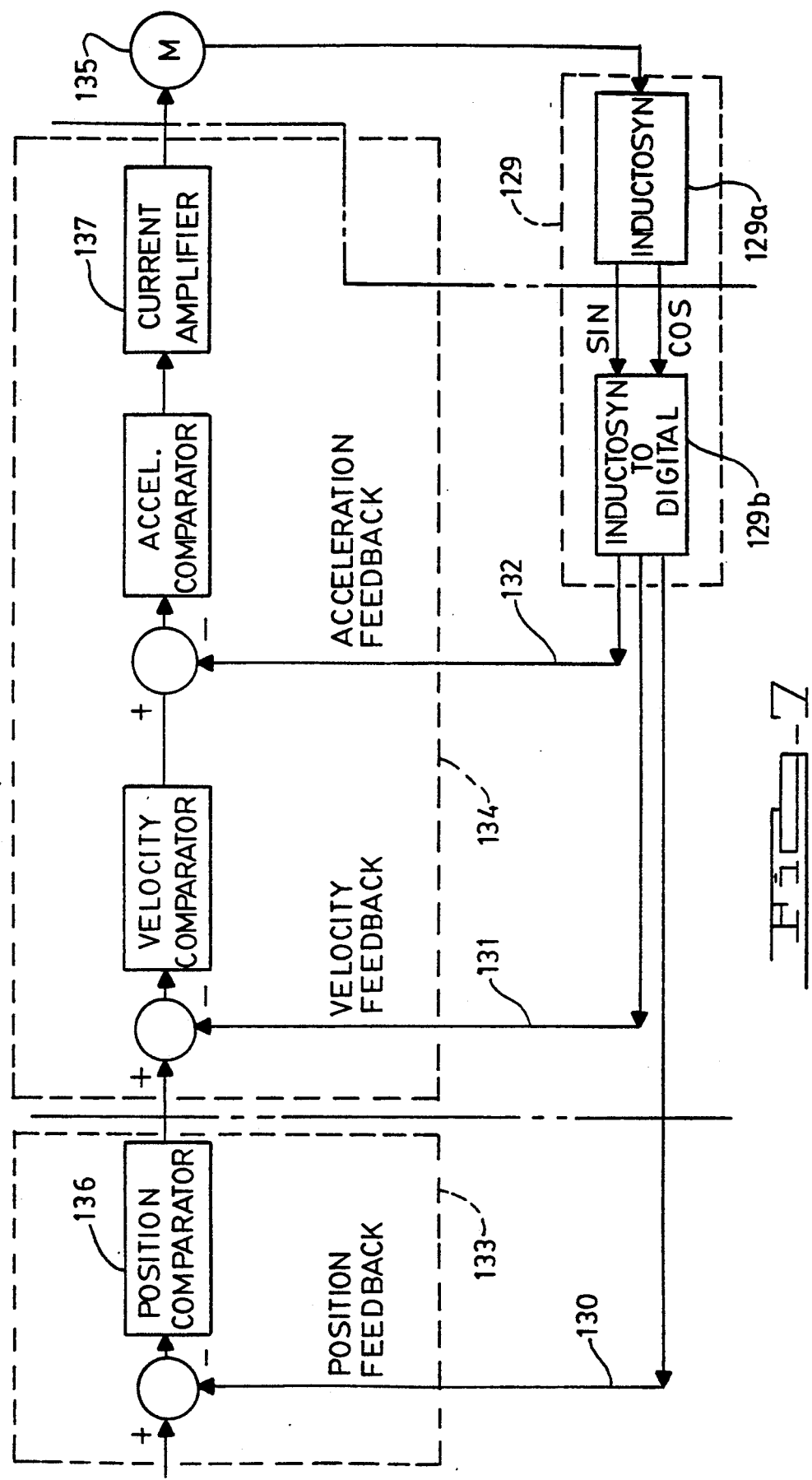
FIG. 7 is a schematic control diagram for the linear motors of a positioning module.

Each linear motor deployed between the support elements of the positioner consists of a stator (preferably coil packs such as 50 on the bed 21) and a linear moving element (preferably rows of permanent magnets such as 99 on table 20 supported on metal channels or strips 66). The linear motors are brushless DC motors having a peak thrust force of about 1000 pounds (max force). The permanent magnets and coil packs can be interchanged between stator and movable element in any specific design application. In the embodiment illustrated herein, electric power supply coil packs form the stator on the fixed bed and form the stator on the cage 31 which is fixed in the Z-axis, whereas rows of supported permanent magnets form the stator on the column which remains fixed along the Y-axis. The coil packs may be constructed of ferromagnetic plates laminated in an epoxy material to provide slots in which coil windings are deposited prior to lamination. The coils may be connected in series within a pack and the packs connected in parallel to a power control, such as shown in FIG. 7. Such control may supply the coils of the linear motors 135 with two, three, or more phases; suitable commutation is used to change the polarity of the coils to keep a constant electromagnetic thrust force in one desired direction to promote linear motion.

Sensors are used to detect the position of the movable elements and send signals to allow the power control to activate or control only those coils needed in the region of movement. Such sensors can be magnetic or optical and are operable with a switching system for the coils. As shown in FIG. 7, a magnetic sensor (scale) is deployed. The power control for each linear motor comprises a magnetic scale device 129, a numerical control device (CNC) 133, and an electronic switching device 134, all connected electrically in series with the linear motors 135. Three motor circuits or feedback loops 130, 131, and 132 incorporate at least two of these devices. Feedback loop 130 connects the linear motor with scale 129 and the output signal of the scale is carried through a null adjuster to a position signal comparator 136 and thence to a current amplifier 137 driving the motor 135. The scale 129 has sine and cosine windings (printed circuits) on a stator 129a and another winding on a rotor 129b. The output signal from the rotor winding 129b is a function of the position of such winding relative to the two other windings of the stator 129a. The output signal can give a mechanical motion indication through comparator 136, or the rate of change of the induced current in the rotor winding can give a velocity signal through the velocity comparator of loop 131 or an acceleration signal through acceleration comparator of loop 132.

A particular feature of this invention is the ability to adapt the machining cell to a newly configured workpiece by merely reprogramming the software in the numerical control device 133 and feedback loop 130. All hardware of the cell need not be changed except for new plate fixtures to hold the new workpieces. This is a significant cost saving in equipment planning.

As the thrust of a linear motor is increased, the mass of the motor tends to increase proportionally and imposes a heavier load on the support structure and lowers the stiffness of the support. Such weight increase is due to the dense ferromagnetic metal used not only in the permanent magnets of the armature but also in the stator windings to achieve a flux density that will render such thrust force feasible. Such increase in thrust and mass to achieve higher accelerations or decelerations progressively defeats the ability to achieve accurate machining by decreasing the stiffness of the support structure and wasting much of the increased acceleration/deceleration capability, because the positioning distance is usually too short to allow attainment of maximum acceleration/deceleration. This machining system uses enhanced stiffness in promoting greater machining accuracy (e.g., ±0.0005 inches) in the machining cell by: (a) increasing the natural frequency of the support structure to be in excess but near that of the operating frequency of the motor drive circuit (i.e., the bandwidth of the control velocity loop as shown in FIG. 7); and (b) limiting motor thrust to that which achieves positioning accelerations/decelerations in the range of about at least one G or more for the spindle. The preferred embodiment obtains a natural mechanical frequency of about 100 hertz while supporting and moving a spindle that weighs about 400 pounds. The operable range for natural mechanical structural frequencies useful for this invention is about 90-200 hertz. The specific techniques for regulating and increasing the natural mechanical frequency of the support structure is shown in copending U.S. application Ser. No. U.S. Ser. No. 07/924,692 commonly assigned to the assignee of this invention.

Figure 8:
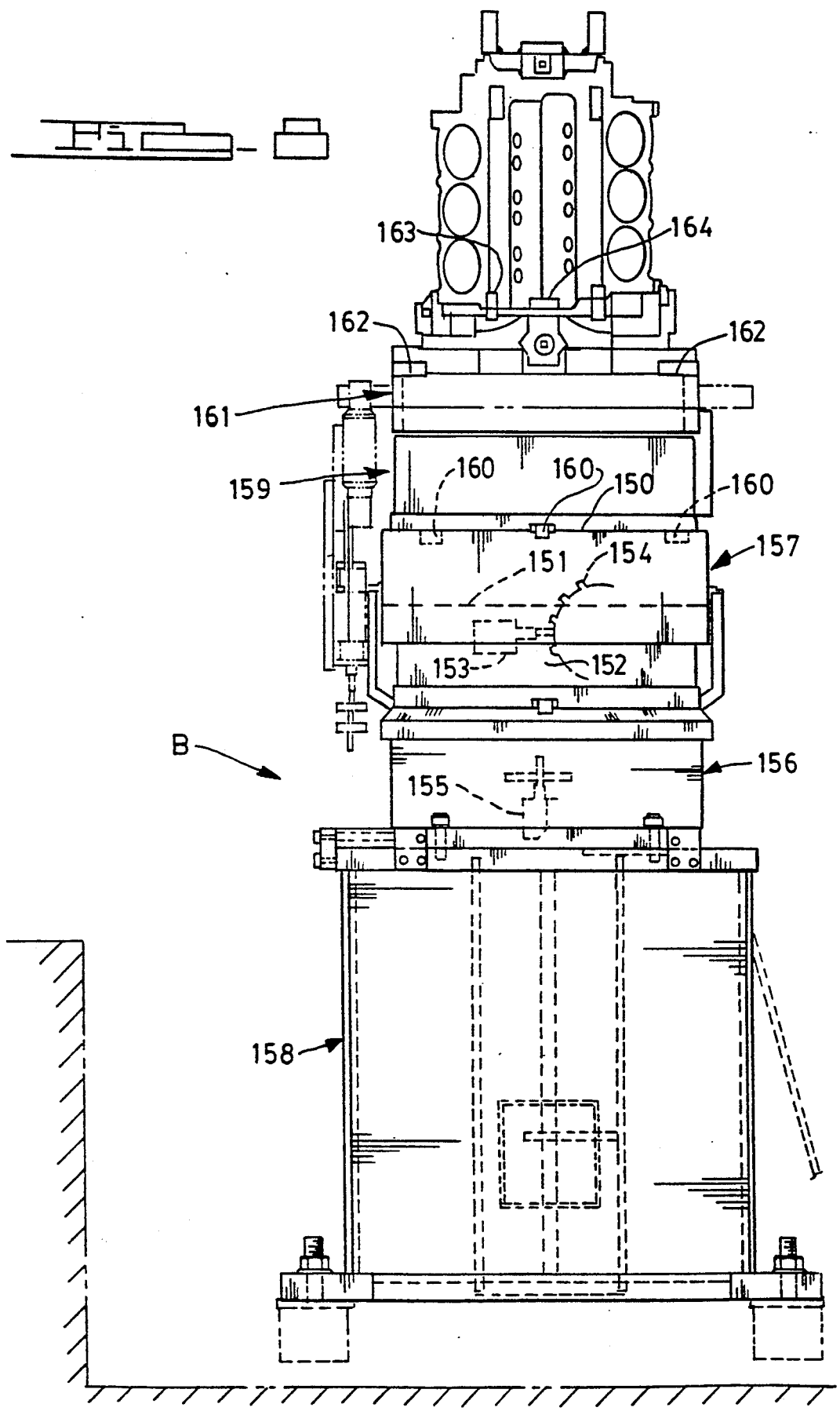
FIG. 8 is an enlarged elevational view of the worktable means and associated equipment of this invention.

As shown in FIG. 8, the adjustable worktable means B comprises a worktable surface 150 that is tiltable about an axis 151 and adjustable rotationally up to 360° about an axis 152. The rotational adjustment 156, sitting atop stand 158, is provided by an electroservo motor 155 that locks surface 150 in place by a coupling to provide rotational accuracy of plus or minus one arc second. The tilting adjustment 157 is provided by an electric servomotor 153 which applies drive to a crank 154 for tilting; the servomotor 153 is lockable in place to an accuracy of plus or minus 10 arc second. The worktable surface has keys or keyways 160 to which may be mated a fixture, receiver, or pallet 159. The element 159 is a receiver here that accepts a fixture 161. The fixture 161 automatically clamps a workpiece fixture at 162 in a desired orientation. The workpiece holding fixture 162 accurately relates to the keyways 160 of the worktable by way of the receiver. The fixture 162 has contact surfaces 163, 164 to nest internally in the specific workpiece, such as an engine block or an engine head, in one orientation to expose the desired surfaces normal to the Z-axis and thereby to the cutting tool. Rapid change of the fixtures is possible to reorient rotationally or angularly a complex workpiece, such as an engine block, to expose other machining sites to the Z-axis. The speed of such reorientation is less than three seconds.

Figure 9:
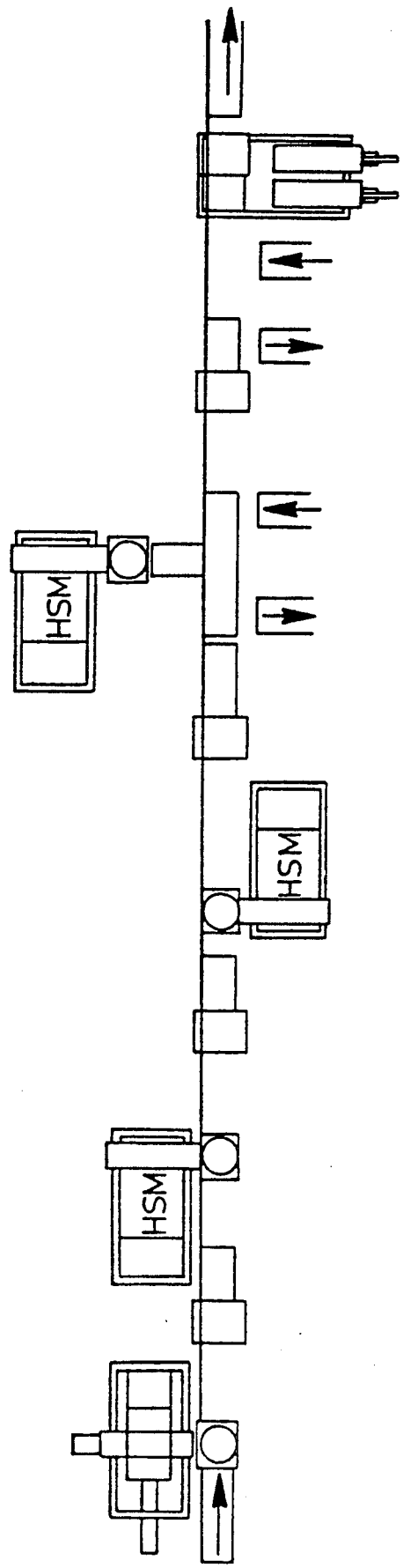
FIG. 9 is a schematic layout of a machining system for producing at least 50,000 typical automotive heads per year and embodying certain of the principles of this invention.

The worktable means of this invention essentially requires only three fixtures 162 for an aluminum engine head: one fixture to orient the rocker cover face to the Z-axis, one to expose all sides (including intake and exhaust) of the head to the Z-axis, and one to expose the joint face to the Z-axis. Thus, as shown in FIG. 9, a machining system for aluminum heads that has the capacity to produce about 50,000 heads per year would have three machining cells (modules 1, 2, and 3), each using a fixture as outlined above to mate with a worktable surface. In this particular layout, qualifying (machining reference surfaces in or on the workpiece) and camshaft boring is optionally carried out by conventional machining cells. In camshaft boring, there is no particular advantage to deploying a rapid-positioning assembly because the cutting tool has an extremely long stroke which must be supported at both ends on a dedicated rotational support. Independent flushing devices are used to cleanse the workpiece of chips after each module completes its machining tasks. Installation of valve seats automatically takes place at the station indicated, requiring dipping in liquid nitrogen to achieve a shrink-fit, and the valve guides are inserted by a press-fit. Cam bearing caps may be installed manually at the station indicated.

Figure 1:
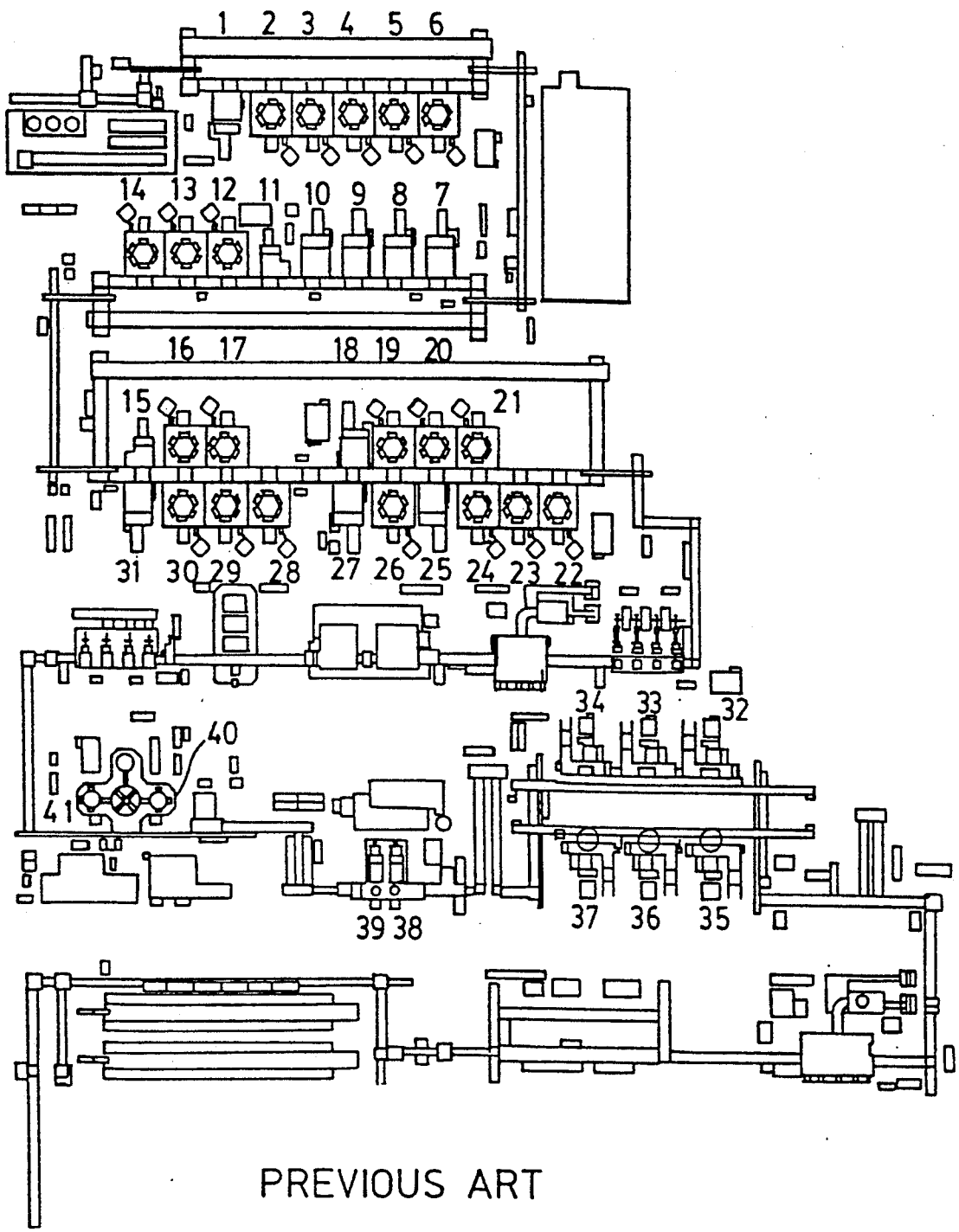
FIG. 1 is a schematic layout of a prior art machining system characteristic of the state of the art.
Figure 10:
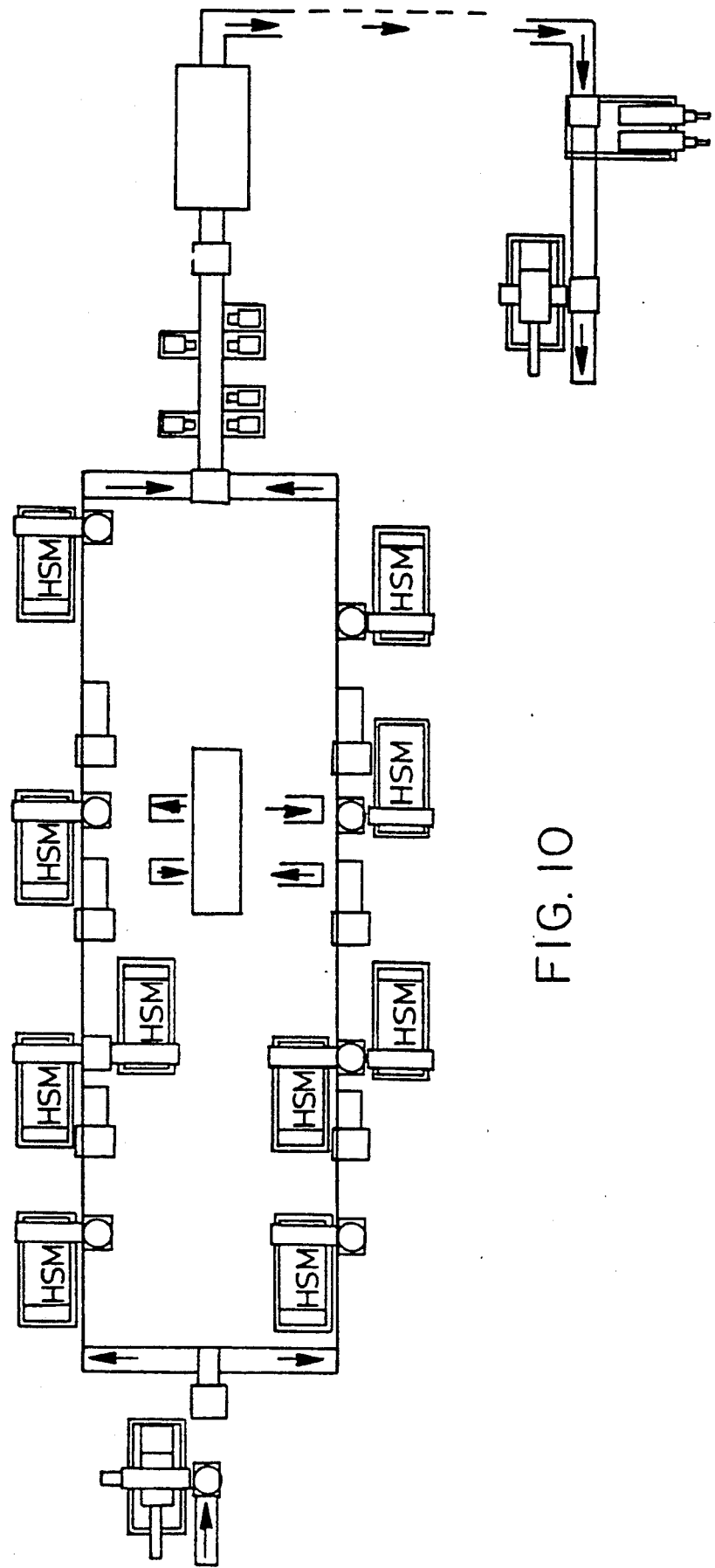
FIG. 10 is a schematic layout of a machining system for producing at least 200,000 automotive aluminum heads per year and embodying the principles of this invention.
Figure 11:
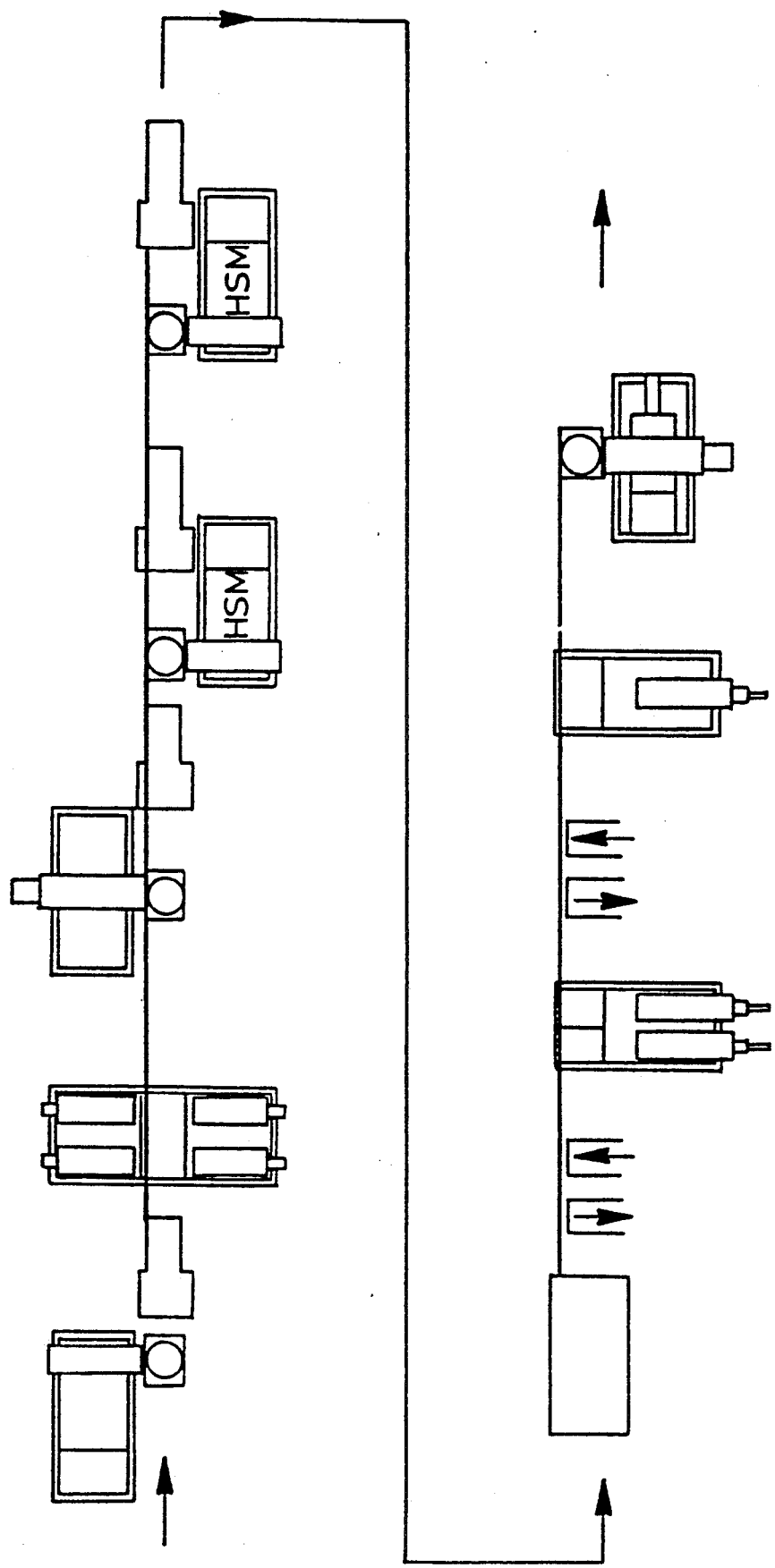
FIG. 11 is a schematic layout of a machining system for producing at least 250,000 automotive aluminum engine blocks per year and embodying certain of the principles of this invention.

To increase the capacity of the system in FIG. 9 to 200,000 heads per year, the number of cells is proportionally increased essentially by four. Generally, this would result in the need for 12 cells (modules). However, 10 cells are only needed in the layout of FIG. 10, with a small portion of low duty machining, such as valve guides and valve seat finishing, being caried out by small conventional machines. Here, the installation of cam bearing caps is carried out automatically. The important point is that such proportioning would require only 18 cells (modules) for a 300,000/year machining line, which is significally fewer than that demanded of state-of-the-art lines such as at least 40 of the block line shown in FIG. 1. Prior art machining cells 1-6 are used to drill, tap, and ream holes in the oil pan face and deep face; considerable transfer time takes place between cells such as by slow power rollers; moreover, reclamping time delays transfer. Relocation time delays transfer and turret indexing is slow. Cells 7-14 are used to drill, tap, and ream holes and cylinder bores in the gasket faces. Cells 15-31 are used to machine the end faces and fine boring in related faces. Cells 32-37 carry out fine honing, cells 38-39 carry out gasket face machining, and cells 40-41 do line boring. No independent flushing devices are used. The worktable means of this invention essentially requires only three fixtures for an engine block: one fixture to orient one or two of the head deck (gasket faces) to the Z-axis, one to expose both ends to the Z-axis, and one to orient the pan rail face (and main bearing caps) to the Z-axis. Thus, as shown in FIG. 11, a machining system for aluminum engine blocks that has the capacity to produce about 50,000 blocks/year would have three machining cells (nodules 1, 2, and 3), each using a fixture as outlined about, to mate with a worktable surface. In this particular layout, qualifying, bulkhead milling, and bore semifinishing and finishing are optionally carried out by conventional machining cells. In bulkhead milling, there is no particular advantage to deploying a rapid-positioning assembly since the cutting tool has such a long stroke it must be supported from opposite ends. Independent flushing devices are used after each module completes its machining tasks. Aluminum chips stick to the workpiece in spite of high velocity flow machining fluids used during machining.

The method of this invention increases the percentage of time that the single-point-tool is in a cutting mode and decreases the time that the workpiece is not being machined and being transferred between machining sites. This dramatically increases the machining cycle effectiveness. The method specifically comprises: (a) locking at least one of a plurality of workpieces on a fixture having dimensional keys and releasably securing the fixture on an adjustable worktable in a predetermined first position facilitated by the keys; (b) adjacent each worktable, rapidly positioning a single-point-tool for linear feed into a first of the workpiece surfaces while in the first position, the positioning being carried out at accelerations/decelerations of at least about one G; (c) feeding the rotating tool into the workpiece to carry out machining and at speeds of 1-1300 inches per minute for drilling and boring, and at least about 5000 sfm for milling; (d) after withdrawing the tool from the workpiece, repositioning the single-point-tool for another linear feed into other workpiece surfaces, the positioning bearing being carried out again at accelerations/decelerations of at least about one G; and (e) after withdrawing the tool from the workpiece, transferring the fixtured workpiece to another of a plurality of worktables while a substituted workpiece is undergoing machining at the worktable.

Ball-screw drive machining cells of the prior art typically only attain feed speeds in machining aluminum of 12 inches per minute for drilling, 32 inches per minute for boring, and 400 sfm for milling when machining aluminum.

As shown in FIG. 2, the worktables are spaced along the system path so that the modular rapid-positioning assemblies are isolated one from another with respect to vibration and interference motion that would affect the accuracy of machining. The machining takes place at ultra-high rotary speeds where the spindle is operated at 30,000-40,000 rpm and linear positioning speeds approach and exceed one G.

The single-spindle or single-point-tool positioner of this invention uniquely cooperates with the cubed tool inventor space for rapid change of machining tools and with an adjustable worktable for reorienting the workpiece during machining to carry out extremely rapid positioning and machining tasks. The machining system has unusual productivity flexibility in that it can be used for a single workpiece to be produced at high volume or a plurality of different workpieces to be produced in lower volumes, without need for dedicated machining heads.

We claim:

1. A system for machining workpieces, comprises:
   (a) a plurality of independently spaced single-point-tool machining cells, each cell having a rapid-positioning assembly for positioning said tool for machining by multiple insertions into one of said workpieces and for positioning said tool for exchange, both at speeds that approach or exceed one G, positioning assembly being comprised of a plurality of support elements, each rapidly positionable while stacked on one another, and a plurality of linear electrical motors effective to move said elements;
   (b) table means having a plurality of worktables for presenting a table surface in a selected plane for each cell, said worktables being arranged along one or more paths, each worktable having identical reference surfaces;
   (c) workpiece mounting means for each worktable having keying surfaces for mating with said reference surfaces and having apparatus for locking said keying surfaces in a position precisely known to said positioning assembly; and
   (d) transfer means for rapidly replacing a machined workpiece with an unmachined workpiece on said table surface, said transfer means providing for transfer of said machined workpiece to another table surface while said substituted workpiece is undergoing machining; and
   (e) computerized electrical control means for selectively activating rapid movement of said positioning assemblies and transfer means, said control means being reprogrammable to adapt said positioning assemblies to a different machining task or workpiece.

2. A multi-positioner machining system for one or more workpieces, comprising:
   (a) a plurality of modular single-point-tool machining cells, each cell having a rapid positioning assembly for positioning the tool at rates that approach or exceed one G for one or more machining storkes on a single workpiece in a single clamped fixture position, each positioning assembly being comprised of a plurality of support elements each rapidly positionable while stacked on one another, and a plurality of linear electrical motors effective to move said elements, said cells being sufficiently separated from each other to eliminate transfer of inertial or vibratory forces therebetween that detract from cell stiffness;
   (b) worktable means for each machining cell and including adjustment apparatus to flexibly orient a workpiece for machining by one cell;
   (c) a fixture having apparatus lockable to a workpiece and clampable to each worktable to present predetermined faces of said workpeice to the machining cell for machining; and (d) transfer means for rapidly moving a fixtured workpiece from cell to cell to facilitate clamping on a worktable.

3. The system as in claim 1, in which said positioning assembly has a natural mechanical frequency that exceeds the electrical operating frequency of said control means to effect a stiffness that achieves positioning accuracies of ±0.0002 inches.

4. The system as in claim 1, in which said transfer means comprises (i) tandem grippers selectively actuatable for gripping a workpiece from opposite sides, and (ii) tandem gantry arms, each movable along X-Y axes and supporting said grippers.

5. The system as in claim 1, in which said table means has tiltable and rotational apparatus.

6. The system as in claim 1, in which said workpiece mounting means has other keying surfaces which coact with internal keying surfaces of said workpiece.

7. The system as in claim 1, in which said workpiece has a predetermined number of workpiece faces that cannot be exposed to the single-point-tool by rotation about a single axis and the number of cells is no greater than said predetermined number.

8. The system as in claim 1, in which each said rapid-positioning assembly carries a selectively driven spindle for rotating said tool at high speeds.

9. The system as in claim 1, in which each said rapid-positioning assembly is effective to make multiple insertions and reinsertions into a cubed machining space containing said workpiece.

10. A system of machining workpieces, comprising:

(a) a plural machining cells spaced along a path, each cell having a single-point--tool carried by a rapid-positioning assembly for positioning the tool for multiple insertions into a workpiece, as well as rapid tool exchange, at speeds that approach or exceed one G, each positioning assembly being comprised of a plurality of support elements each rapidly positionable while stacked on one another, and a plurality of linear electrical motors effective to move said elements;

(b) table means for presenting a table surface in a selected plane for each cell;

(c) workpiece mounting means for each table surface having keying surfaces and apparatus for lockingly mating with a reference point of such table surface;

(d) transfer means for rapidly replacing a machined workpiece with an unmachined workpiece on a table surface, said means being effective to transfer the workpiece to the next table surface while the substituted workpiece is undergoing machining; and (e) electrical control means for activating said positioning assemblies and transfer means.

11. The machining system as in claim 2, in which said transfer means is comprised of a robotic arm movable along a rail for workpiece transfer movement.

12. The machining system as in claim 2, in which each of said machining cells is identical in construction and function, and are substitutable one for another.

* * * * *